United States Patent

Oeller

Patent Number: 6,131,447
Date of Patent: Oct. 17, 2000

[54] PROCESS AND ARRANGEMENT FOR CHECKING THE OPERABILITY OF A SECONDARY AIR PUMP IN AN INTERNAL-COMBUSTION ENGINE

[75] Inventor: Heinz Oeller, Reichertshausen, Germany

[73] Assignee: Bayerische Motoren Werke Aktiengesellschaft, Munich, Germany

[21] Appl. No.: 09/134,519

[22] Filed: Aug. 14, 1998

[51] Int. Cl.⁷ ................ F01N 3/22; F01N 7/00; G01M 15/00
[52] U.S. Cl. .............. 73/118.1; 73/118.2; 701/29
[58] Field of Search ................. 73/116, 117.2, 73/117.3, 118.1, 118.2; 701/101, 103, 29–35

[56] References Cited

U.S. PATENT DOCUMENTS

| | | | |
|---|---|---|---|
| 4,892,072 | 1/1990 | Miwa et al. | 123/340 |
| 5,659,134 | 8/1997 | Tanaka et al. | 73/118.1 |
| 5,709,082 | 1/1998 | Harris et al. | 73/118.1 |
| 5,714,683 | 2/1998 | Maloney | 73/118.2 |
| 5,753,805 | 5/1998 | Maloney | 73/118.2 |
| 5,845,627 | 12/1998 | Olin et al. | 123/676 |

FOREIGN PATENT DOCUMENTS

| | | |
|---|---|---|
| 0 663 516 | 7/1995 | European Pat. Off. . |
| 42 25 361 A1 | 2/1994 | Germany . |
| 43 43 639 A1 | 6/1995 | Germany . |
| 195 39 938 A1 | 4/1997 | Germany . |
| 6-146867 | 8/1994 | Japan . |
| WO 98/13589 | 4/1998 | WIPO . |

*Primary Examiner*—George Dombroske
*Attorney, Agent, or Firm*—Evenson, McKeown, Edwards & Lenahan, P.L.L.C.

[57] ABSTRACT

In the case of a process for checking the operability of a secondary air pump in an internal-combustion engine in a motor vehicle using an electronic control unit, the control unit detects the rotational speed of the internal-combustion engine and the throttle valve angle in the intake system of the internal-combustion engine. Using a characteristic diagram stored in the control unit, as a function of the detected rotational speed and the detected throttle valve angle, the rate of air flow into the cylinders of the internal-combustion engine is estimated. Using an air flow rate sensor, the overall rate of air flow is sensed which is composed of the air flow into the cylinders of the internal-combustion engine and the secondary air flow delivered by way of a secondary air pipe into an exhaust gas duct. Subsequently, the difference is analyzed between the overall rate of air flow and the rate of air flow into the cylinders of the internal-combustion engine to determine the operability of the secondary flow system.

4 Claims, 2 Drawing Sheets

PROCESS AND ARRANGEMENT FOR CHECKING THE OPERABILITY OF A SECONDARY AIR PUMP IN AN INTERNAL-COMBUSTION ENGINE

BACKGROUND AND SUMMARY OF THE INVENTION

This application claims the priority of German Patent Application No. 197 35 318.5, filed Aug. 14, 1997, the disclosure of which is expressly incorporated by reference herein.

The invention relates to a process and arrangement for checking the operability of a secondary air pump in an internal-combustion engine in a motor vehicle using an electronic control unit.

Such a process is known, for example, from German Patent Document DE 43 43 639 A1. The need for such a process is based on an arrangement which blows fresh air into the exhaust gas duct between the internal-combustion engine and the catalyst in a motor vehicle for bringing the catalyst to the operating temperature as quickly as possible. By means of the exothermal reaction between the exhaust gas and the blown-in fresh air in the exhaust gas duct, an accelerated heating of the catalyst occurs. In order to keep the pollutant emissions as low as possible, it is endeavored to heat the catalyst to its operating temperature as fast as possible. For this purpose, a properly operating secondary air pump is required. In the case of the process known from German Patent Document DE 43 43 639 A1, the operability of the secondary air system, including the secondary air pump, is judged by means of the air flow rate (secondary air flow) generated by the secondary air system. For this purpose, a quantity which characterizes the secondary air flow, among others, is determined from the air/fuel ratio of the mixture taken-in by the internal-combustion engine and from the air/fuel ratio existing downstream of the lead-in of the secondary air pipe in the exhaust gas duct. For determining the air/fuel ratios, a lambda probe is used which is already present in any event. The known process for checking the operability of the secondary air system can therefore not be started before the lambda probe is operable. However, normally the lambda probe only becomes operable once the blowing-in of fresh air by means of the secondary air pump for heating the catalyst is no longer required. As quickly as a few seconds after a cold start of the internal-combustion engine, as a result of the switched-on secondary air pump, the HC-fraction and the Co-fraction of the exhaust gases is reduced to such an extent that the secondary air pump could already be switched off. According to the known process, a longer running time of the secondary air pump is therefore required in order to be able to carry out only the secondary air pump diagnosis. However, a longer running time of the secondary air pump, on the one hand, causes an increased NOx-fraction in the exhaust gas and, on the other hand, a considerably reduced service life of the secondary air pump.

It is an object of the invention to provide a process for checking the operability of a secondary air pump in the case of an internal-combustion engine, which process is independent of the operational readiness of the lambda probe.

This object is achieved by a process for checking the operability of a secondary air pump in the case of an internal-combustion engine in a motor vehicle via an electronic control unit. The control unit detects the rotational speed of the internal-combustion engine and the throttle valve angle in the intake system of the internal-combustion engine. Using a characteristic diagram stored in the control unit, as a function of the detected rotational speed and of the detected throttle valve angle, the rate of air flow into the cylinders of the internal-combustion engine is estimated. The overall rate of air flow is sensed by an air flow rate sensor. The overall rate is composed of the air flow into the cylinders of the internal-combustion engine and of the secondary air flow delivered by way of the secondary control pipe into the exhaust gas duct. The difference between the overall rate of air flow and the rate of air flow into the cylinders of the internal-combustion engine is then analyzed to check the operability of the secondary air pump.

An advantageous arrangement for implementing the process is characterized in that the inlet of the secondary air pipe in the form of a bypass in the intake system branches off behind the air flow rate sensor and in front of the throttle valve.

According to the invention, an electronic control unit, preferably the internal-combustion engine control unit, detects the rotational speed of the internal-combustion engine and the throttle valve angle in the intake system of the internal-combustion engine. Then, by means of a characteristic diagram stored in the control unit, as a function of the detected rotational speed and the detected throttle valve angle, the rate of air flow into the cylinders of the internal combustion engine is estimated. Furthermore, by means of a rate of air flow sensor present anyhow, the overall rate of the air flow is measured which is composed of the rate of air flow into the cylinders of the internal-combustion engine and of the rate of secondary air flow delivered by way of the secondary air pipe into the exhaust gas duct. Then, the difference between the overall rate of air flow and the rate of air flow into the cylinders of the internal-combustion engine is analyzed. Preferably, it is examined in this case whether the overall rate of air flow is larger than the rate of air flow into the cylinders of the internal-combustion engine.

An advantageous arrangement for implementing the process has a bypass to the intake system as the secondary air pipe, through which the secondary air flow is delivered by means of the secondary air pump from the intake system into the exhaust gas duct. The inlet of the bypass branches off behind the rate of air flow sensor and in front of the throttle valve in the intake system.

With the process according to the invention and with the arrangement according to the invention, the operability of the secondary air pump or of the secondary air system can be checked independently of the lambda probe so that it is not necessary to wait for the operational readiness of the lambda probe. The checking of the operability of the secondary air pump can therefore be carried out immediately after a cold start of the engine. As a result, the time period during which the secondary air pump is on is also only a function of the operating temperature of the catalyst. This results in a reduced operating period which also increases the service life of the secondary air pump.

Other objects, advantages and novel features of the present invention will become apparent from the following detailed description of the invention when considered in conjunction with the accompanying drawings.

DETAILED DESCRIPTION OF THE DRAWINGS

Figure 1:
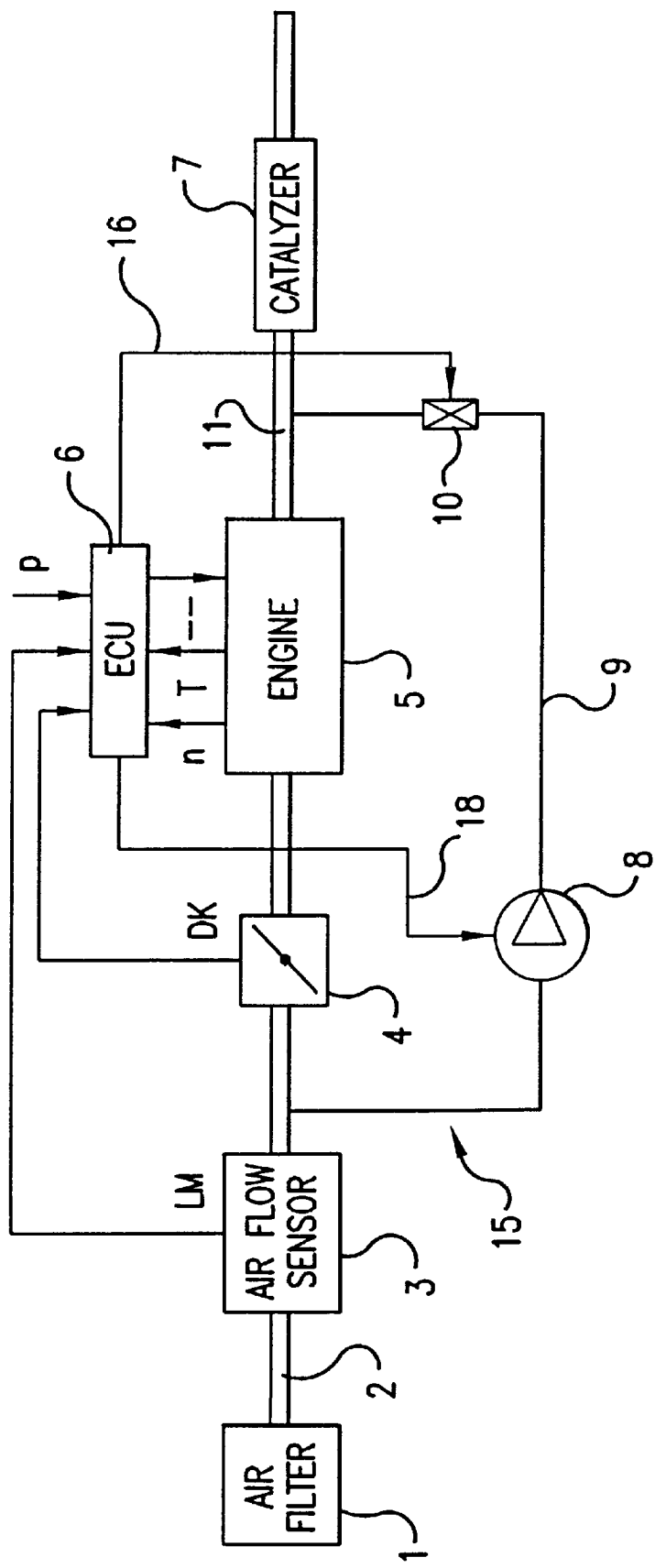
FIG. 1 illustrates an embodiment of the present invention, schematically showing the intake system as well as the exhaust duct of an internal-combustion engine with a secondary air system arrangement by which the process of the invention can be carried out.

In the intake system 2 of the internal-combustion engine 5, an air filter 1 is connected with an air flow rate sensor 3, the air flow rate sensor 3 is connected with a throttle valve 4, and the throttle valve 4 is directly connected with the internal-combustion engine 5. An electronic control unit 6 (ECU) is assigned to the internal-combustion engine 5. The outlet of the internal-combustion engine 5 is adjoined by the exhaust gas duct 11 which has a catalyst 7. Between the air flow rate sensor 3 and the throttle valve 4 in the intake system 2, the inlet of a secondary air pipe 9 branches off in the form of a bypass 15. The outlet of the secondary air pipe 9 leads into the exhaust gas duct 11. The secondary air flow is delivered by means of the secondary air pump 8. A valve 10 is arranged on the outlet-side in the secondary air pipe 9 in order to, on the one hand, seal off the exhaust gas duct 11, when the secondary air pump 8 is switched off, and, on the other hand, influence the apportioning (metering) of the secondary air flow.

The electronic internal-combustion engine control unit 6 has electric inputs and outputs. At the inputs of the electronic control unit 6, among others, the rotational speed n of the internal-combustion engine 5, the operating temperature T of the internal-combustion engine 5, the ambient pressure p, the throttle valve angle DK and an electric signal LM from the air flow rate sensor 3 are detected. At the outputs of the control unit 6, for example, control signals for actuators of the internal-combustion engine 5 and, particularly, a control signal 16 for triggering the valve 10 as well as a control signal 18 for triggering the secondary air pump 8 are emitted.

Preferably during the cold start of the internal-combustion engine 5, for an accelerated heating of the catalyst 7, the secondary air pump 8 is switched on and the valve 10 is opened in order to deliver the secondary air flow into the exhaust gas duct 11. As soon as the secondary air pump 8 has been switched on, a check of its operability can begin. Basically, the checking of the operability takes place by the analysis of the difference between the overall rate of air flow taken into the intake system 2 and the air flow into the cylinders of the internal-combustion engine which, in the case of an operable secondary air pump 8, is equal to the secondary air flow. The secondary air flow as well as the air flow into the cylinders of the internal-combustion engine 5 are taken in to the input of the secondary air pipe 9 as the overall air flow by way of the intake system 2. This overall rate of air flow in the intake system 2 is sensed by means of the air flow rate sensor 3. From the electric signal LM of the air flow rate sensor 3, the control unit 6 determines a quantity characterizing the overall rate of air flow. Furthermore, a characteristic diagram is stored in the control unit 6 by which, as a function of the detected rotational speed n and the detected throttle valve angle DK, a quantity is formed which characterizes the rate of air flow into the cylinders of the internal-combustion engine. This quantity can preferably be corrected as a function of the operating temperature T of the internal-combustion engine and/or of the ambient pressure p. This correction can be defined, for example, in each case at the next cold start of the internal-combustion engine. If newly changed ambient conditions (pT) are present, a new correction will take place.

If the control unit 6 does not recognize that the measured overall rate of air flow is larger than the rate of air flow into the cylinders of the internal-combustion engine, a conclusion is drawn that a defect is present, particularly the breakdown of the secondary air pump 8, since in this case no secondary air flow is delivered from the intake system 2 into the exhaust gas duct 11.

Figure 2:
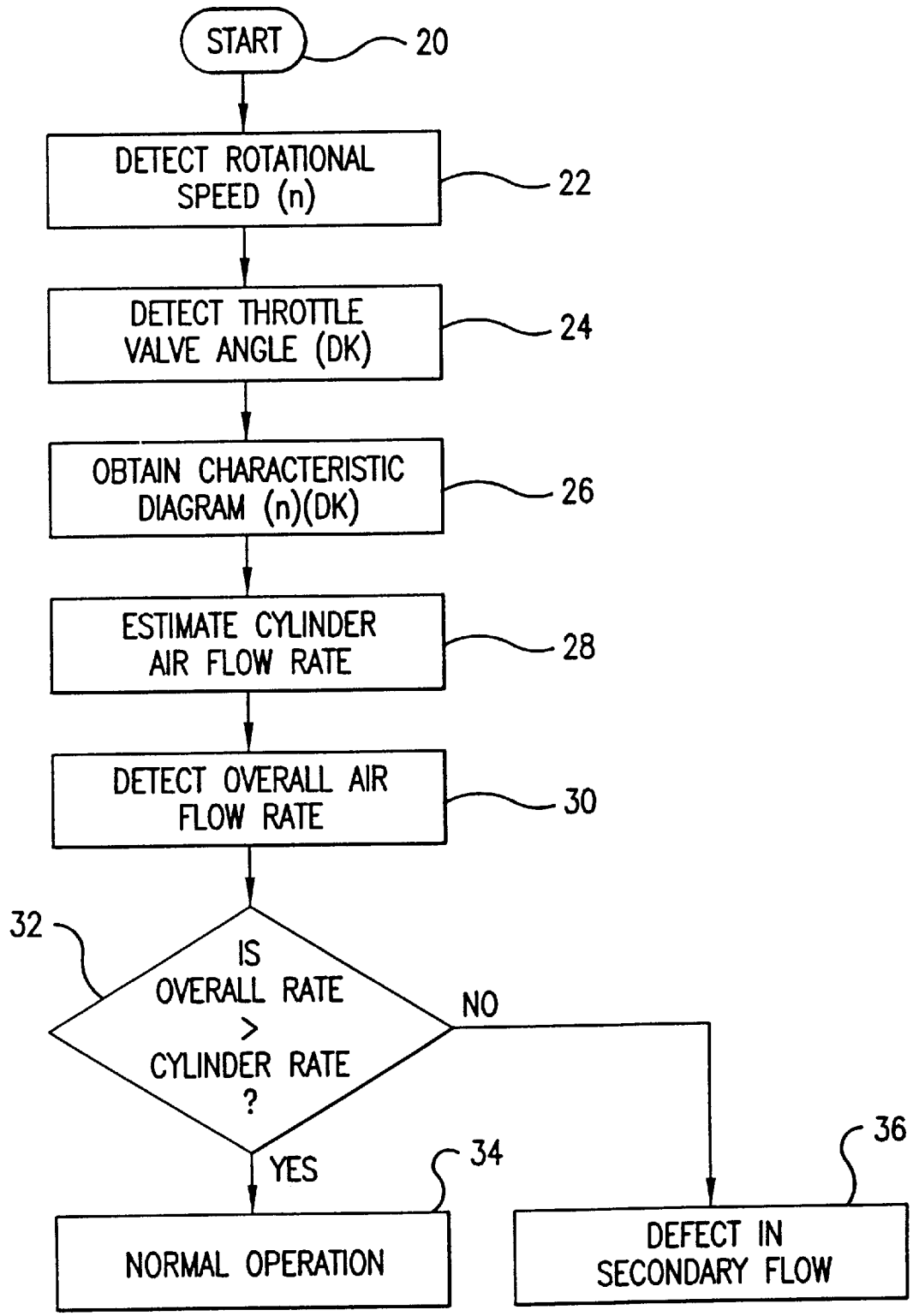
FIG. 2 is a flow chart illustrating a preferred process for performing the present invention performed, for example, by a software program in the electronic control unit.

FIG. 2 is an example of a flow chart for performing the process according to the present invention. The operation starts (step 20) by detecting the rotational speed of the internal-combustion engine (step 22) and the throttle valve angle (step 24) from the throttle valve arranged in the intake system. The program obtains a characteristic diagram stored in the electronic control unit (step 26) to allow the estimation of the air flow rate into the cylinders of the internal-combustion engine (step 28) based on the detected rotational speed and throttle valve angle. The overall air flow rate is detected via an air flow rate sensor arranged in the intake system (step 30). The process then compares the overall air flow rate to the air flow rate into the cylinders of the internal-combustion engine (step 32). As one example for analyzing the two air flow rates, it is determined whether the overall air flow rate is greater than the air flow rate into the cylinders such that if true, then the secondary flow around the cylinders of the internal-combustion engine is operating normally (step 34). However, if the overall air flow rate is not greater than the air flow rate through the cylinders, then the process detects a defect in the secondary flow (step 36).

In a supplementary manner, it is pointed out that the process according to the invention can also be used in the case of internal-combustion engines with two suction systems. Normally, in the case of internal-combustion engines with two suction systems, a secondary air system is assigned to a first suction system, whereas the second suction system is not equipped with a secondary air system. In this case, for checking the operability of the secondary air pump, the difference is formed between the overall rate of air flow in the intake system of the first suction system and the rate of air flow into the cylinders of the internal-combustion engine assigned to the first suction system.

By means of the embodiment according to the invention, using only one air flow rate sensor, which is required anyhow for controlling the internal-combustion engine, the secondary air flow can also be determined. Since the switch-on duration of the secondary air pump is not defined longer than required for the heating of the catalyst, the service life of the secondary air pump is increased and the increased fraction of an NOx-emission is prevented which would be otherwise created by an extended switch-on duration. The shortened switch-on duration of the secondary air pump is achieved in that it is not necessary to await the operational readiness of the lambda probe since the checking of the operability of the secondary air pump is not dependent on the signal of the lambda probe.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for checking the operability of a secondary air pump in a motor vehicle having an internal-combustion engine and an electronic control unit, the process comprising the acts of:

detecting a rotational speed of the internal-combustion engine and a throttle valve angle in an intake system of the internal-combustion engine;

estimating a rate of air flow into cylinders of the internal-combustion engine as a function of the detected rotational speed and throttle valve angle based on a characteristic diagram stored in the electronic control unit;

sensing an overall rate of air flow via an air flow rate sensor, said overall rate of air flow being composed of the air flow into the cylinders of the internal-combustion engine and a secondary air flow delivered via a secondary control pipe into an exhaust gas duct; and analyzing any difference between the overall rate of air flow and the rate of air flow into the cylinders of the internal-combustion engine.

2. The process according to claim 1, wherein the analyzing act further comprises the act of determining that a defect is present in the secondary air pump when the overall rate of air flow is not larger than the rate of air flow into the cylinders of the internal-combustion engine.

3. An arrangement for performing a process which checks the operability of a secondary air pump in a motor vehicle having an internal-combustion engine and an electronic control unit, an intake system of the internal-combustion engine;

an air flow rate sensor arranged in the intake system and providing an overall air flow rate signal to the electronic control unit;

a secondary air pipe forming a bypass around the internal-combustion engine from the intake system, said secondary air pipe branching off the intake system downstream of the air flow rate sensor;

throttle valve arranged in the intake system, the inlet of the secondary air pipe branching off of the intake system upstream of the throttle valve; and wherein said arrangement detects a rotational speed of the internal-combustion engine and a throttle valve angle, estimates a rate of air flow into cylinders of the internal-combustion engine as a function of the rotational speed and throttle valve angle via a characteristic diagram stored in the electronic control unit, senses an overall rate of air flow composed of the air flow into the cylinders and a secondary air flow into an exhaust gas duct, and analyzes a difference between the overall rate of air flow and the rate of air flow into the cylinders.

4. A software product comprising a computer readable medium having stored thereon program code segments that:

detects a rotational speed of the internal-combustion engine and a throttle valve angle in an intake system of the internal-combustion engine;

estimates a rate of air flow into cylinders of the internal-combustion engine as a function of the detected rotational speed and throttle valve angle based on a characteristic diagram stored in the electronic control unit;

senses an overall rate of air flow via an air flow rate sensor, said overall rate of air flow being composed of the air flow into the cylinders of the internal-combustion engine and a secondary air flow delivered via a secondary control pipe into an exhaust gas duct; and analyzes any difference between the overall rate of air flow and the rate of air flow into the cylinders of the internal-combustion engine.

* * * * *